(12) United States Patent
Jordan (10) Patent No.: US 7,481,640 B1
(45) Date of Patent: Jan. 27, 2009

(54) SCRAPLESS THERMOFORMING MACHINE

(75) Inventor: Alan Jordan, Fitchburg, WI (US)

(73) Assignee: Coextruded Plastic Technologies, Inc., Edgerton, WI (US)

( * ) Notice: Subject to any disclaimer, the term of this patent is extended or adjusted under 35 U.S.C. 154(b) by 771 days.

(21) Appl. No.: 11/063,678

(22) Filed: Feb. 23, 2005

(51) Int. Cl.
*B29C 43/00* (2006.01)

(52) U.S. Cl. .................. 425/110; 425/112; 425/117; 425/127; 425/383

(58) Field of Classification Search .............. 425/110, 425/117, 127, 129.1, 383, 112; 264/322
See application file for complete search history.

(56) References Cited

U.S. PATENT DOCUMENTS

| | | | |
|---|---|---|---|
| 3,528,143 A * | 9/1970 | Beneke | 425/145 |
| 3,669,594 A | 6/1972 | Brown et al. | |
| 3,926,298 A * | 12/1975 | Miller et al. | 198/370.1 |
| 3,947,204 A | 3/1976 | Ayres et al. | |
| 3,951,636 A * | 4/1976 | Gunthner | 65/207 |
| 3,964,237 A | 6/1976 | Johansen | |
| 4,005,967 A | 2/1977 | Ayres et al. | |
| 4,048,781 A | 9/1977 | Johansen | |
| 4,088,526 A | 5/1978 | Amberg et al. | |
| 4,120,932 A | 10/1978 | Roth | |
| 4,133,625 A | 1/1979 | Kellermann et al. | |
| 4,150,936 A | 4/1979 | Shioi et al. | |
| 4,234,530 A | 11/1980 | Thiel et al. | |
| 4,563,325 A | 1/1986 | Coffman | |
| 4,790,972 A * | 12/1988 | Coffman | 264/152 |

(Continued)

FOREIGN PATENT DOCUMENTS

CA    2318933    7/1999

(Continued)

OTHER PUBLICATIONS

Wonderpack Industries, "Disk Fed Thermoforming Machine", http://www.wonderpackindustries.com/pages/cpf1.htm (1 page), undated, printed May 31, 2002.

(Continued)

*Primary Examiner*—Steven P Griffin
*Assistant Examiner*—Saeed M Huda
(74) *Attorney, Agent, or Firm*—Foley & Lardner LLP (57) ABSTRACT

A scrapless thermoforming machine includes a plurality of transport trays having frames configured to hold thermoplastic billets and billet clamps. An oven is configured to heat the billets and a forming press is configured to form the billets into containers. A loading and unloading station has a billet loading side and a container unloading side. The loading and unloading station includes a clamp transfer station having a clamp transfer shuttle configured to move the clamps from the container unloading side to the billet loading side and a transport tray unloading mechanism on the container unloading side configured to unload the clamps and formed containers from a selected transport tray to the clamp transfer station. The loading and unloading station further includes a billet placement station on the billet loading side configured to place the thermoplastic billets onto billet shuttle, the billet shuttle configured to move the billets from the billet placement station to the billet loading side of the clamp transfer station and a transport tray loading mechanism configured to transfer the clamps and the billets from the clamp loading station to the selected transport tray on the billet loading side.

22 Claims, 11 Drawing Sheets

U.S. PATENT DOCUMENTS

| | | | |
|---|---|---|---|
| 4,836,764 A | 6/1989 | Parkinson | |
| 4,883,633 A | 11/1989 | French | |
| 4,892,604 A | 1/1990 | Measells et al. | |
| 4,915,230 A | 4/1990 | Mancini | |
| 4,997,691 A | 3/1991 | Parkinson | |
| 5,091,231 A | 2/1992 | Parkinson | |
| 5,798,079 A | 8/1998 | Freek et al. | |
| 5,863,568 A | 1/1999 | Tomita et al. | |
| 5,935,511 A | 8/1999 | Brown | |
| 5,996,837 A | 12/1999 | Freek et al. | |
| 6,094,890 A | 8/2000 | Michellon et al. | |
| 6,202,998 B1 | 3/2001 | Gupte | |
| 6,336,805 B1 | 1/2002 | Padovani | |
| 6,896,506 B1 | 5/2005 | Jordan | |
| 2002/0079617 A1* | 6/2002 | Kageyama et al. | 264/322 |
| 2003/0024404 A1* | 2/2003 | Daniel et al. | 100/3 |

FOREIGN PATENT DOCUMENTS

| | | |
|---|---|---|
| EP | 0 666 794 B1 | 8/1995 |
| EP | 972 627 A2 | 1/2000 |
| EP | 0 995 700 A1 | 4/2000 |
| JP | 57-27723 A | 2/1982 |
| JP | 58-140207 A | 8/1983 |
| TW | 436406 | 5/2001 |
| WO | WO 95/33617 A1 | 12/1995 |
| WO | WO 99/37465 A1 | 7/1999 |
| WO | WO 01/60587 A1 | 8/2001 |

OTHER PUBLICATIONS

Hassia USA—Products, http://www.hassiausa.com/products/ (1 page), undated, printed May 31, 2002.

Eval Company of America, Technical Bulletin No. 150, Thermoforming of Eval® Resin Containing Structures, (11 pages), marked "Rev. 07-00."

Coralfoam, Articulated cavity process enables preforms to be blow molded or vacuum formed during the injection machine's mold open stroke, (2 pages), undated.

* cited by examiner

SCRAPLESS THERMOFORMING MACHINE

FIELD OF THE INVENTION

The present invention relates to scrapless thermoforming. In particular, the present invention relates to a machine and associated method for scrapless thermoforming of input plastic materials into containers.

BACKGROUND OF THE INVENTION

A thermoformer or thermoforming machine typically has a series of stages that transform input plastic material into finished containers. The input material is a thermoplastic substance that can be formed when heated. A common thermoplastic material is polypropylene. The finished containers are commonly used to hold food or beverages, and may be formed into a variety of sizes and shapes depending on the thermoforming process that is utilized.

Thermoplastic materials may be fed into a thermoforming machine in the form of a continuous sheet or as individually cut blanks or billets. When the input materials are individual thermoplastic billets, the process is called "scrapless thermoforming" because the finished containers need not be cut from a sheet after forming, reducing the amount of scrap material. In scrapless thermoforming, a billet feeding unit is typically used to load individual billets onto a conveying device in the machine.

Prior to being formed into containers, the billets must be heated to the desired temperature. The desired temperature depends on the structure of the machine being used as well as the desired properties of the end product. For example, containers may be formed while the thermoplastic material is below the crystalline melt point of the material. Such forming is known as solid-phase pressure forming. Other methods involve heating the material to its melting point prior to forming. Such a process is known as melt-phase thermoforming.

A conventional scrapless thermoforming machine has several stages used to create formed containers. First, the billets are loaded into the machine. Second, an oven is used to heat the billets to the desired temperature. Third, a forming station or form press utilizes a hydraulic press or other suitable means to form the individual containers. After exiting the form press, the formed containers are removed from the machine at an unloading station. Other stations may be added to the thermoforming machine as desired, such as a preheating oven and a coining press to form an initial container edge prior to entry into the main oven.

One challenge associated with conventional thermoforming machines is the efficient use of the trays used to transport billets and associated tooling. A typical scrapless thermoforming machine has a billet loading station at one end of the machine and a container unloading station at the other end of the machine. Such a configuration requires the transport of unloaded empty trays from the container unloading station back to the loading station. One way of transporting the empty trays back to the loading station is to do so on a different vertical level from the loaded trays, such as by utilizing an elevator to move the trays onto a conveyor below the loaded trays for transport in the opposite direction. However, such a configuration may be disadvantageous because the long distance transport of empty trays is inefficient from an overall process standpoint, and the conveyor system required to transport the empty trays, such as the chains and belts and so forth, increases the number of components on the machine with a corresponding increase in the possibility of component breakage, thus increasing machine down time.

Further, the machinery necessary to change the vertical level of the various trays in order to recycle the empty trays is complex, including drive mechanisms and tray transfer mechanisms, again increasing the chance of machine malfunction and down time.

An additional disadvantage of a thermoforming machine that requires empty tray transport over a substantial distance is the increase in the number of trays and amount of tooling required for machine operation. Each empty tray being transported at a given point in time represents an inefficient use of the tray, associated frames, and any clamps and so forth used to secure the billets.

Because scrapless thermoforming machines typically utilize a number of separate trays to transport plastic billets through the stages of the machine, a drive system is required to move the trays from station to station. A typical drive system includes a series of inter-connected chains or belts used to drive the transport trays. Design challenges associated with machines utilizing a chain drive system include designing the interface between the chains and the individual trays, especially where the trays change direction or vertical level, requiring a transfer from one chain drive to the next. Further, a chain drive system may not allow for individual control of trays, and therefore provides less flexibility in the movement of the trays, such as changes to tray speed or position, and may also be prone to malfunction, increasing machine down time.

Individual transport trays used in a scrapless thermoforming machine must have a mechanical interface with the drive system. A typical approach is to utilize wheels or rollers on the trays that ride within rails or another type of guide mechanism. One disadvantage of such a design is that the cost of each transport tray increases with the addition of the moving components, such as wheels.

Accordingly, there is a need for a scrapless thermoforming machine that makes more efficient use of tooling, including the transport trays used to convey plastic blanks. Further, there is a need for a scrapless thermoforming machine that does not utilize a chain or belt drive system to transport the trays from station to station in the machine. Further still, there is a need for a thermoforming machine that does not utilize wheels or rollers on each transport tray. It would be desirable to provide a machine and/or method that provides one or more of these or other advantageous features. Other features and advantages will be made apparent from the present specification. The teachings disclosed extend to those embodiments that fall within the scope of the appended claims, regardless of whether they accomplish one or more of the aforementioned needs.

SUMMARY OF THE INVENTION

The invention relates to a scrapless thermoforming machine having a plurality of transport trays with frames configured to hold thermoplastic billets and billet clamps. The machine has an oven configured to heat the billets and a forming press configured to form the billets into containers. A loading and unloading station has a billet loading side and a container unloading side. The loading and unloading station includes a clamp transfer station having a clamp transfer shuttle configured to move clamps from the container unloading side to the billet loading side and a transport tray unloading mechanism on the container unloading side configured to unload the clamps and containers from a selected transport tray to the clamp transfer station. The loading and unloading station further includes a billet placement station configured to place thermoplastic billets onto a billet shuttle, the billet shuttle configured to move the billets from the billet placement station to the billet loading side of the clamp transfer station. The loading and unloading station further includes a transport tray loading mechanism configured to transfer the clamps and billets from the clamp loading station to the selected transport tray on the billet loading side.

The invention further relates to a scrapless thermoforming machine having a track, a loading and unloading station, a heating station, and a forming station. A plurality of transport trays are configured to transport thermoplastic billets. A plurality of wheels are rotatably coupled to the track, the wheels configured to support the transport trays. A plurality of servo motors are coupled to the track and configured to move the transport trays around the track.

The invention further relates to a method of forming a container from a plastic billet, the method including the steps of loading a plastic billet onto a billet shuttle, moving the billet shuttle to a clamp transfer station, transferring the billet and a clamp to a transport tray, and heating the billet to a temperature suitable for thermoforming. The method further includes the steps of forming a container from the billet, unloading the container and the clamp from the transport tray, placing the clamp onto a clamp shuttle, and moving the clamp transfer shuttle to meet with the billet shuttle.

The invention is capable of other embodiments and of being practiced or being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED EMBODIMENTS

Figure 1:
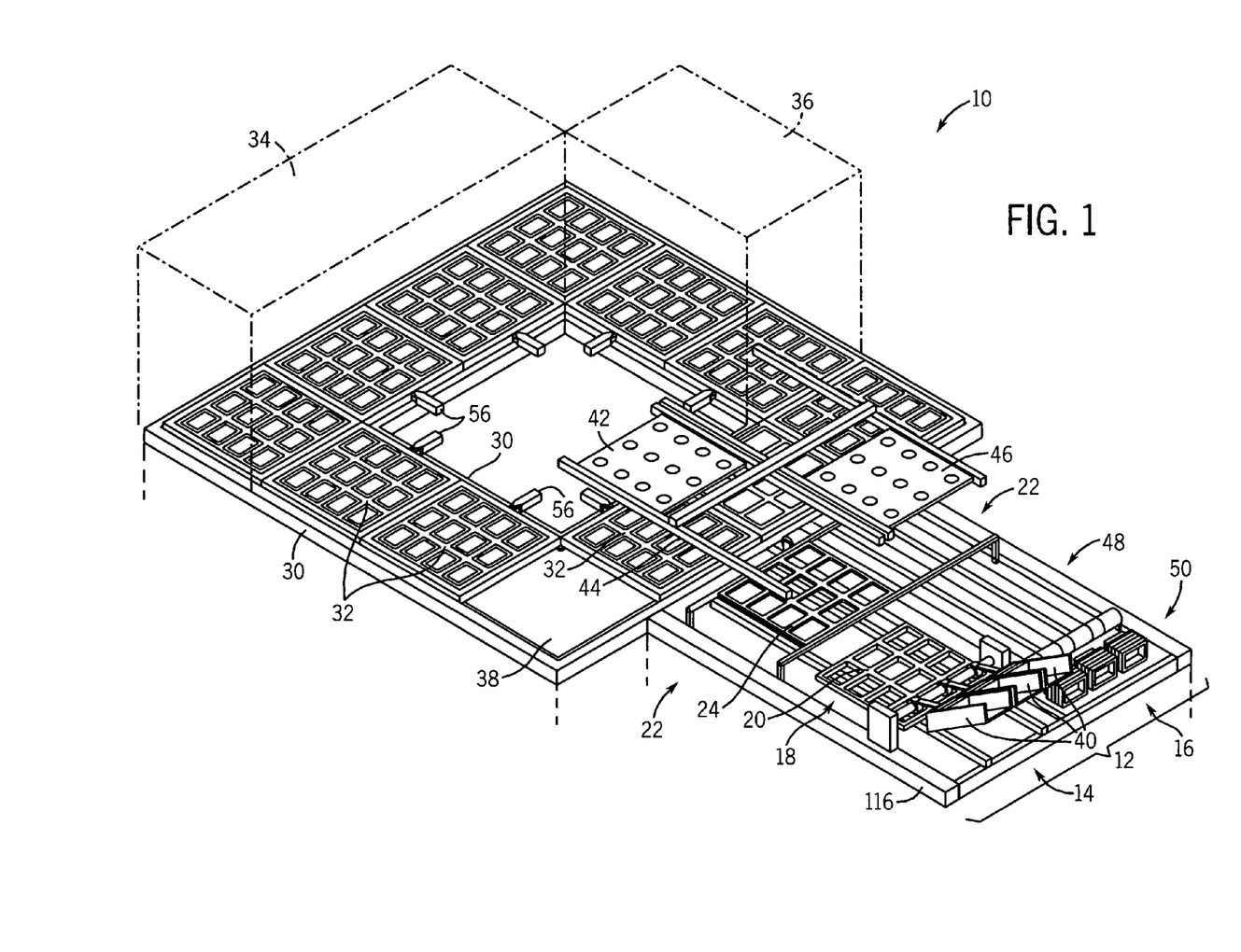
FIG. 1 is a schematic perspective view of a scrapless thermoforming machine.

Referring to FIG. 1, a scrapless thermoforming machine 10 is shown schematically and includes a number of stations that are used to transform thermoplastic billets into formed containers. In particular, a loading and unloading station 12 includes a billet loading side 14 and a container unloading side 16. The billet loading side includes a billet feeding unit, shown as a billet placement station 18, used for loading the individual thermoplastic billets onto a billet shuttle 20 and a clamp transfer station 22 used to transfer tooling, such as billet clamps, from the container unloading side 16 to the billet loading side 14. A clamp transfer shuttle 24 is used for the transfer of the clamps. The scrapless thermoforming machine 10 includes a frame 30 used to support a number of transport trays 32 that are used to transport the thermoplastic billets around the main portion of the scrapless thermoforming machine 10.

In the embodiment depicted in FIG. 1, the main portion of the scrapless thermoforming machine 10 a heating station 34 and a forming station 36. FIG. 1 depicts eleven transport trays 32 that are moved about the scrapless thermoforming machine 10 on a track extending around a closed loop along the square perimeter of the frame 30. An open space 38 is utilized to permit the transport trays 32 to be moved about the generally square track as will be explained in more detail below.

The heating station 34 may include an oven used to heat the thermoplastic billets to the desired temperature as is known in the art. Further, the forming station 36 may include a form press that may be any one of a number of a types of form presses known in the art used to form thermoplastic containers from individual billets. Although not shown, the scrapless thermoforming machine 10 may also include other stations known in the art such as a preheater or a coining press. The other components may be situated on different portions of the track depending on the chosen method of forming the thermoplastic containers. In an exemplary embodiment, the scrapless thermoforming machine 10 is used to form thermoplastic containers from individual billets utilizing the components and stages described in U.S. application Ser. Nos. 10/234,278 and 10/651,748, filed Sep. 4, 2002 and Aug. 29, 2003, respectively, both of which are incorporated herein by reference in their entirety.

In the embodiment shown in FIG. 1, the transport trays 32 travel in a closed loop, beginning at the billet loading side 14 of the loading and unloading station 12, traveling to the heating station 34, to the forming station 36, and then to the container unloading side 16 of the loading and unloading station 12, where the finished product is removed from the transport tray 32. Rather than traveling the length of the machine to be loaded again after container removal, an individual transport tray 32 need only move on the track from the container unloading side 16 to the billet loading side 14 to be loaded with fresh billets to begin the process again after the containers are unloaded.

Because the transport trays 32 do not leave the track, other mechanisms are utilized to load and unload the billets, containers, and other hardware at the loading and unloading station 12. On the billet loading side 14, the billet shuttle 20 receives new billets from a billet sleeve 40. The billet shuttle then travels to the clamp transfer station 22 on the billet loading side 14. A transport tray loading mechanism 42 is configured to lift the individual billets and any clamps that are utilized from the billet shuttle 20 and clamp transfer shuttle 24, and move the billets and tooling to the transport tray 32 located on the billet loading side 14 of the loading and unloading station 12. The transport tray loading mechanism 42 moves along an elevated track 44 (schematically shown in FIG. 1) between the transport tray track and the clamp transfer station 22 in order to load the billets onto transport trays 32. Adjacent the transport tray loading mechanism 42, also on the elevated track 44, is a transport tray unloading mechanism 46 that is utilized to remove formed containers from the transport trays 32, along with the associated hardware, such as clamps. The transport tray unloading mechanism 46 deposits the formed containers and hardware at the clamp transfer station 22, the clamps being placed upon the clamp transfer shuttle 24 and the formed containers falling through the clamp transfer shuttle 24 onto a container transport mechanism 48 that brings the formed containers to a container storage area 50.

Figure 2:
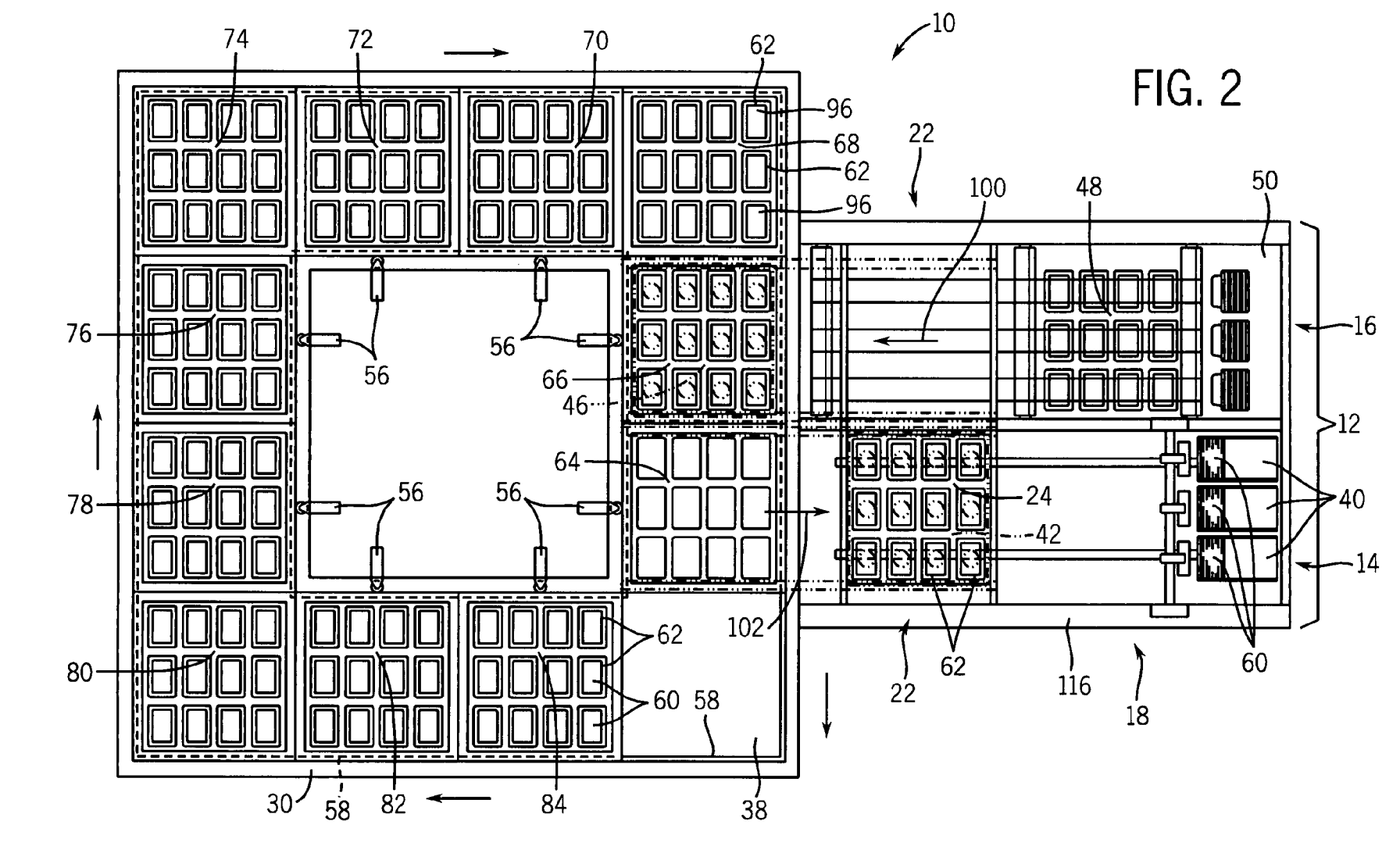
FIG. 2 is a schematic plan view of a scrapless thermoforming machine.

Referring to FIG. 2, the scrapless thermoforming machine 10 is shown in a schematic plan view in order to indicate the movement of the various components. The components relating to the heating station 34 and forming station 36 (see FIG. 1) are not shown in FIG. 2 or FIG. 3. The transport trays are labeled individually for explanatory purposes in FIGS. 2 and 3 although the transport trays all have the same mechanical structure to provide interchangeability of transport trays in a preferred embodiment.

Referring to FIG. 2, the transport trays are supported by the track 58, which is schematically shown as an edge extending inwardly from the sides of the frame 30 and is shown in phantom as a dashed line underneath the various transport trays in all but the open space 38 where the track 58 is visible. The transport trays are moved around the track 58 in a preferred embodiment by a number of servo motors 56 as will be explained in more detail below.

Figure 3:
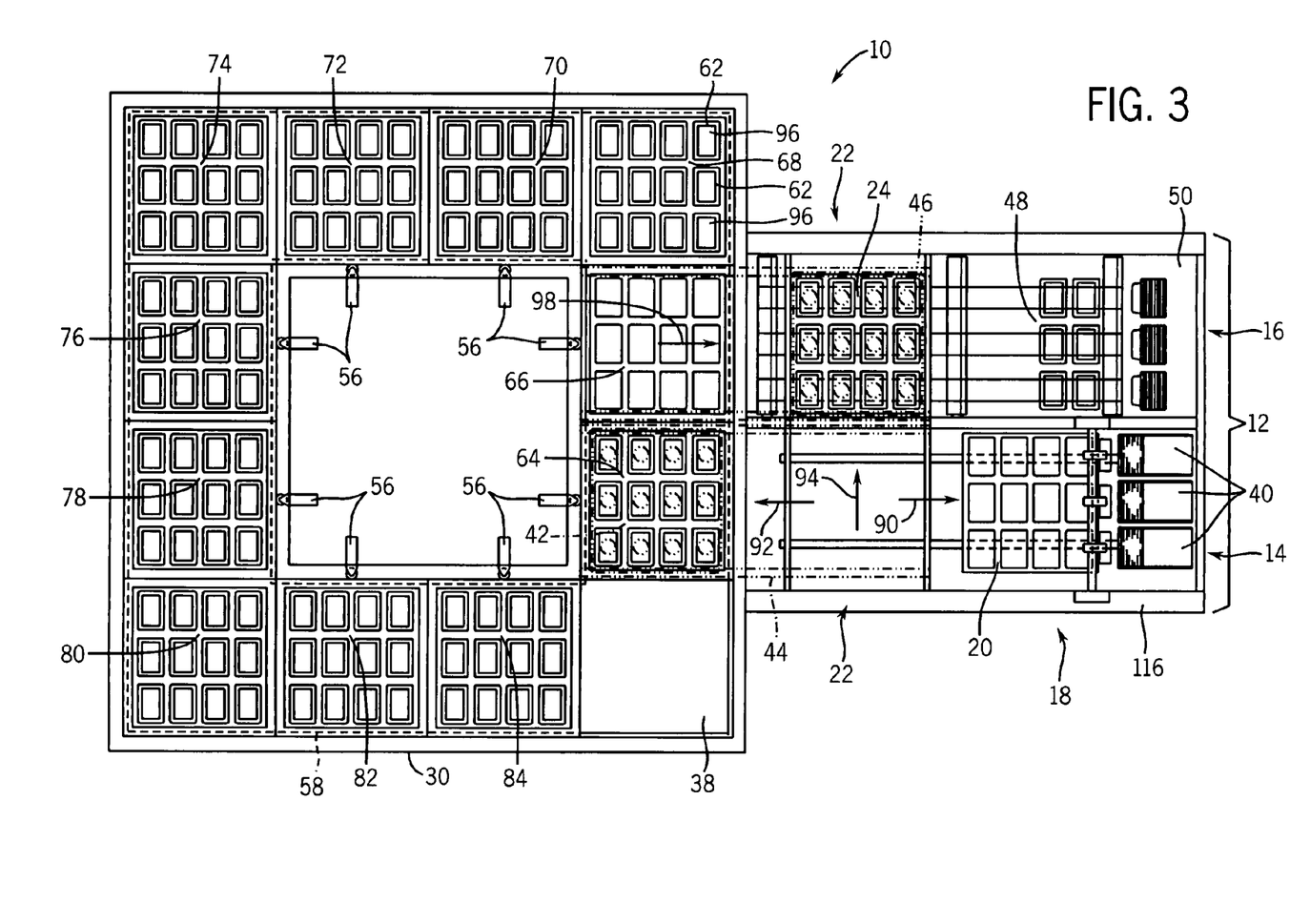
FIG. 3 is a schematic plan view of a scrapless thermoforming machine.

Further referring to FIGS. 2 and 3, transport tray 64 is initially located on the billet loading side 14 of the loading and unloading station 12. In FIG. 2, billets 60, which are initially loaded in the billet sleeves 40, have not been loaded into the transport tray 64. Instead, the transport tray 64 is prepared to receive a number of individual billets 60 that will be placed onto a number of frames (not shown in detail) that are removably coupled to the transport tray 64. The use of frames in a transport tray is explained in more detail in U.S. application Ser. No. 10/651,748. In a preferred embodiment, the individual frames have a ledge or blade that supports the perimeter of the individual billets 60. In addition to the billets 60, in a preferred embodiment, a number of clamps 62 may also be loaded onto the transport trays in order to further secure the billets 60. The clamps 62 maintain the placement of the individual billets 60 by applying weight to the exterior of the billets 60 while leaving the center portion of the billets 60 open for heating and being formed into containers by a form press. A number of the billets 60 and clamps 62 are labeled on transport tray 84.

The transport tray loading mechanism 42 is utilized to transfer clamps 62 and billets 60 onto the transport tray 64. The transport tray loading mechanism 42 is shown in phantom in FIGS. 2 and 3 so as to allow viewing of the underlying transport tray 64 and clamp transfer shuttle 24. Prior to utilizing the transport tray loading mechanism 42 to load the transport tray 64, the billet shuttle 20 is loaded with individual billets 60 from the billet sleeve 40. Referring to FIG. 3, the billet shuttle 20 travels in the direction of arrow 90 from the clamp transfer station 22 to the billet placement station 18 to be loaded with billets from the billet sleeves 40.

In FIG. 2, the billet shuttle 20 has been moved beneath the clamp transfer shuttle 24 and is therefore hidden from view (see FIG. 1 for a perspective view of the relative elevations that permit the billet shuttle 20 to slide underneath the clamp transfer shuttle 24). The apertures on the clamp transfer shuttle 24 are large enough to permit the individual billets 60 to be lifted upward through the apertures, but are sized to support the clamps 62. The transport tray loading mechanism 42 may be coupled to the billets 60 on the billet shuttle 20 and the clamps 62 on the clamp transfer shuttle 24 and lift all of the billets and clamps simultaneously to be transferred to the empty transport tray 64 for loading.

Referring to FIG. 3, as the transport tray loading mechanism 42 (shown in phantom on FIG. 3) moves in the direction of arrow 92 to load billets 60 and clamps 62 onto the transport tray 64, the billet shuttle 20 moves in the direction of arrow 90 to the billet placement station 18 to be loaded with more billets 60 for loading of the next transport tray in the sequence, transport tray 66. Further, clamp transfer shuttle 24 moves in the direction of arrow 94 to the container unloading side 16 of the clamp transfer station 22 in order to be loaded with the clamps that are removed from transport tray 66.

Note that in the sequence step shown in FIG. 2, while the transport tray loading mechanism 42 is picking up the billets 60 and clamps 62 for loading onto the transport tray 64, the transport tray unloading mechanism 46 (shown in phantom on FIG. 2) is simultaneously unloading clamps 62 and formed containers 96 from transport tray 66.

Further referring to FIGS. 2 and 3, after exiting the forming station 36, the transport trays will be carrying formed containers 96 that are maintained in place by the clamps 62 in an exemplary embodiment. A number of the formed containers 96 are labeled on transport tray 68. The transport tray unloading mechanism 46 is designed to lift the formed containers 96 and associated clamps 62 from the transport tray 66 in the loading and unloading station 12 and deliver the formed containers 96 and clamps to the clamp transfer station 22. Referring to FIG. 3, as the transport tray unloading mechanism 46 moves in the direction of arrow 98, the clamp transfer shuttle 24 moves in the direction of arrow 94 to meet with the transport tray unloading mechanism 46, sliding underneath the transport tray unloading mechanism 46. The transport tray unloading mechanism 46 may then release the clamps 62 and formed containers 96, the formed containers 96 dropping through the apertures in the clamp transfer shuttle 24 and onto the container transport mechanism 48 for transport to the container storage area 50 while the clamps 62 are retained in the clamp transfer shuttle 24 for delivery to the billet loading side 14 of the loading and unloading station 12. In an exemplary embodiment, the clamp transfer shuttle 24 moves in the direction of arrow 94, the transport tray loading mechanism 42 moves in the direction of arrow 92, the billet shuttle 20 moves in the direction of arrow 90, and the transport tray unloading mechanism 46 moves in the direction of arrow 98 simultaneously.

Once transport tray 64 has been loaded with billets 60 and clamps 62, it is ready to be transported to the next station on the scrapless thermoforming machine 10. In an exemplary embodiment, the transport trays are driven by servo motors 56. The substantially square configuration of the track 58 in the embodiment depicted in FIGS. 1-3 lends itself to a staggered motion of the transport trays as follows. After transport tray 64 has been loaded at the loading and unloading station 12, transport trays 64, 66 and 68 may be shifted toward the open space 38, driven by the servo motors 56. Such a movement places transport tray 66, which has just been unloaded by transport tray unloading mechanism 46, into position on the billet loading side 14 of the loading and unloading station 12 and places transport tray 64 into the former open space 38. Further, transport tray 68, carrying formed containers 96, is moved to the container unloading side 16 of the loading and unloading station 12 for unloading purposes.

In an exemplary embodiment, as transport trays 64, 66, and 68 are moved together toward the open space 38, the transport tray unloading mechanism 46 moves in the direction of arrow 100 and the transport tray loading mechanism 42 moves in the direction of arrow 102 (see FIG. 2), while at the same time, the billet shuttle 20 moves in the reverse direction of arrow 90 and the clamp transfer shuttle 24 moves in the reverse direction of arrow 94 (see FIG. 3). The combined motion of transport trays 64, 66, and 68 along with the transport tray loading mechanism 42, tray unloading mechanism 46, billet shuttle 20, and clamp transfer shuttle 24, places the transport tray unloading mechanism 46 into position to unload transport tray 68, places the unloaded transport tray 66 into the billet loading side 14, and places the loaded billet shuttle 20 underneath the clamp transfer shuttle 24 and into position for lifting of the clamps 62 and billets 60 by the transport tray loading mechanism 42 for later transport to the empty transport tray 66. Meanwhile, the loaded transport tray 64 has been moved one position forward in the machine along the track 58.

After the movement of transport trays 64, 66, and 68, a new open space is located in the space formerly occupied by transport tray 68. Accordingly, transport trays 70, 72, and 74 may then be moved toward the new open space, followed by the shifting of transport trays 76, 78, and 80 toward the open space formerly occupied by transport tray 74, followed again by shifting of transport trays 82, 84, and 64 toward the open space formerly occupied by transport tray 80. Accordingly, an open space is then available at position 38 to begin the space over again. The above-described motion of the transport trays about the track 58 enables the use of a track in the shape of a polygon, in the embodiment of FIGS. 1-3, a square track. The polygon shape permits straight segments of track that are desirable when transporting the trays through the heating station, for example, to ensure even heating of all the billets, as compared to a circular track.

The use of servo motors 56 to move the transport trays permits greater freedom in machine operation relative to the use of an interconnected chain-drive system. For example, the trays can be moved individually at any speed and in any direction on the track. Further, a mechanical failure in one part of the drive system will not necessarily affect other parts of the drive system as would be the case in a chain-driven system.

Figure 4:
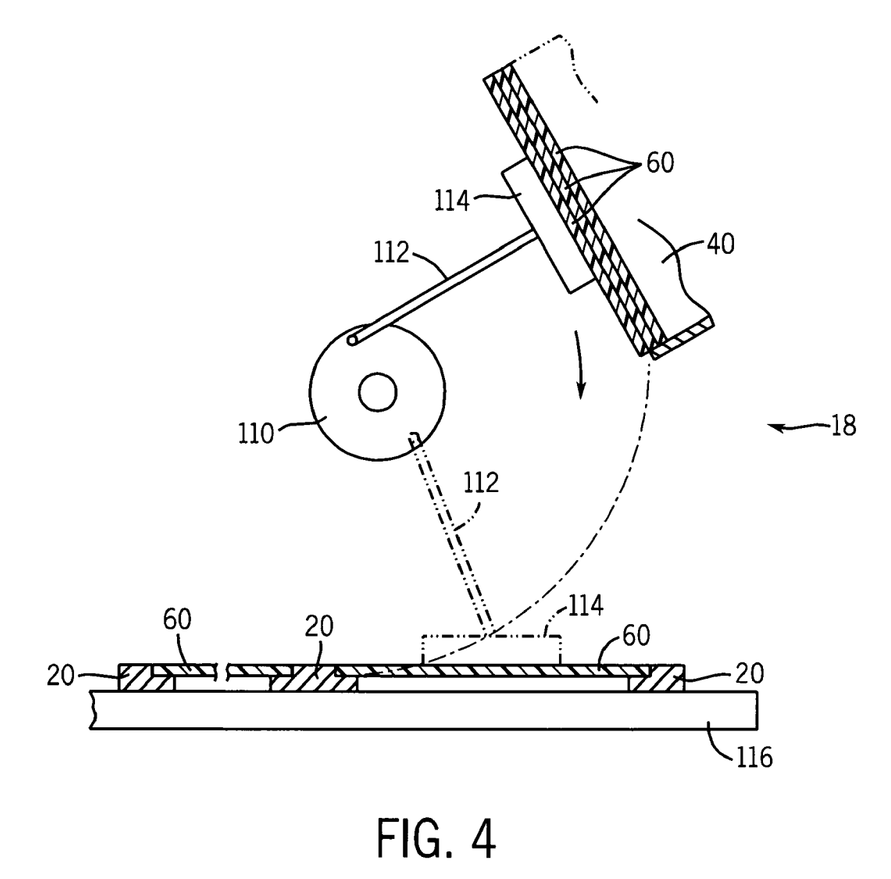
FIG. 4 is a schematic sectional view of a billet loading station.

Referring to FIG. 4, a schematic sectional view of the billet placement station 18 is shown with the billet shuttle 20 in place and being loaded with billets 60. A billet picker 110 includes an arm 112 having a suction device 114 on a distal end thereof that is used to pick individual billets 60 from billet sleeve 40 and place the billets 60 into position onto the billet shuttle 20. A portion of the frame 116 of the loading and unloading station 12 is also depicted. In an exemplary embodiment, the billet picker 110 includes three arms that simultaneously pick three billets 60 from adjacent sleeves 40 (see FIG. 1) and places them three at a time to fill a row of the billet shuttle 20, the billet shuttle 20 then being moved forward for placement of another row of billets 60, and so forth until each of the empty slots on the billet shuttle 20 are loaded and ready for transport to the clamp transfer station 22 (see FIG. 1). Although the billet picker 110 is shown as utilizing a suction approach in FIG. 1, other methods of placing individual thermoplastic billets onto horizontal transport mechanisms are known in the art and may be utilized.

Figure 5:
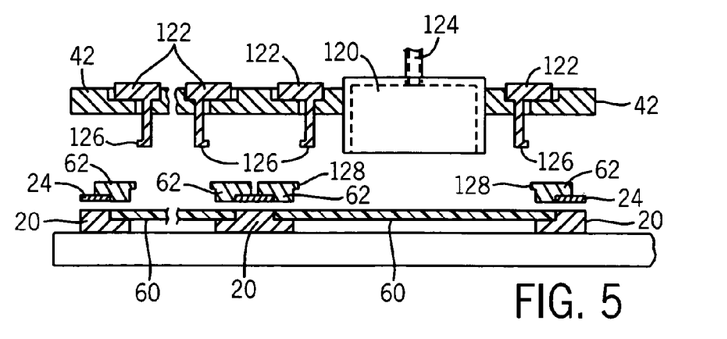
FIG. 5 is a schematic sectional view of a transport tray loading mechanism positioned above a clamp transfer shuttle and a billet shuttle.

Referring to FIGS. 5-8, the sequence in which the transport tray loading mechanism 42 picks up the clamps 62 and billets 60 for transport to a transport tray is shown according to an exemplary embodiment. FIG. 5 depicts the step in which the transport tray loading mechanism 42 is situated above the clamp transfer shuttle 24, the clamp transfer shuttle 24 supporting a number of clamps 62, and the clamp transfer shuttle is situated above the billet shuttle 20, the billet shuttle 20 supporting a number of individual billets 60. The orientation of the three transport devices in FIG. 5 is similar to that depicted in the plan view of FIG. 2. To aid in the understanding of the use and positioning of the transport tray loading mechanism 42, clamp transfer shuttle 24, and billet shuttle 20, the three devices are shown schematically.

Referring specifically to FIG. 5, the transport tray loading mechanism 42 includes a number of clamp lifters 122, each having a hook 126 configured to engage with a corresponding ledge 128 on opposite sides of the clamps 62 for lifting purposes. The transport tray loading mechanism 42 also includes a number of billet lifters 120 (only one is shown in the view of FIG. 5, but in a preferred embodiment, one billet lifter 120 is utilized for each of the billets in the transport tray, twelve billets in the case of the embodiment depicted in FIGS. 1-3).

Figure 6:
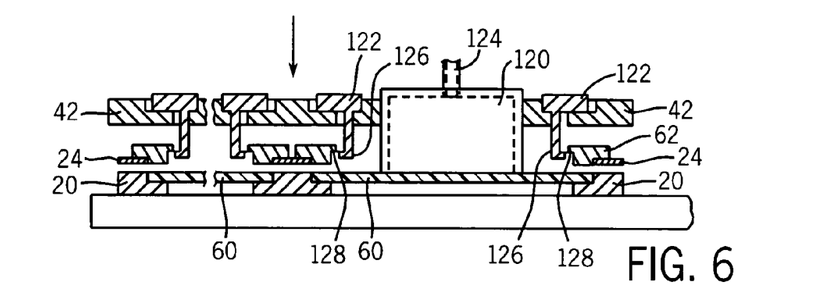
FIG. 6 is a schematic sectional view of the transport tray loading mechanism poised to engage a number of clamps and billets.
Figure 7:
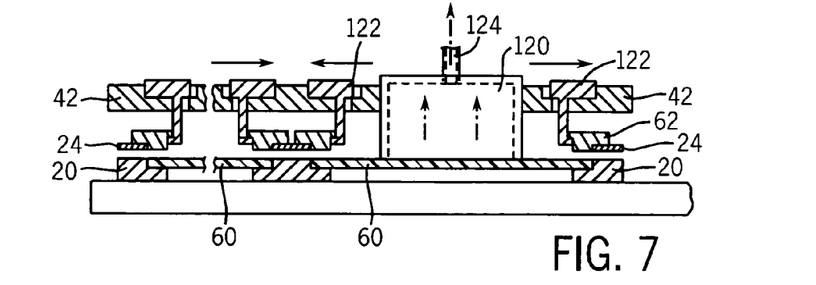
FIG. 7 is a schematic sectional view of the transport tray loading mechanism engaged with a number of clamps and billets.
Figure 8:
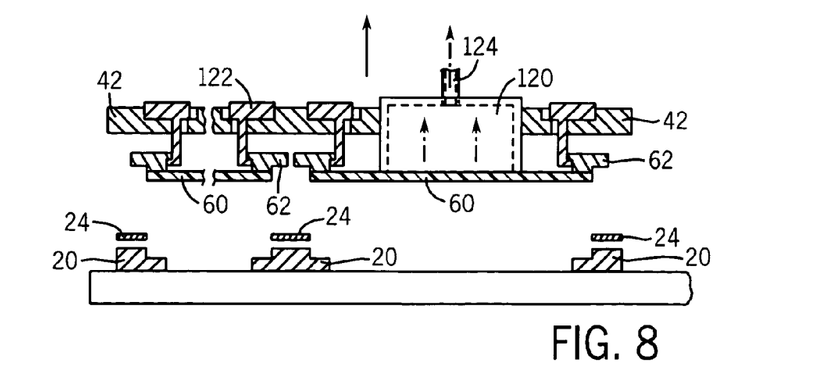
FIG. 8 is a schematic sectional view of the transport tray loading mechanism having lifted a number of billets and clamps.

Referring to FIG. 6, in order to engage and lift the billets 60 and clamps 62 from the billet shuttle 20 and clamp transfer shuttle 24 respectively, the transport tray loading mechanism 42 drops downward with the clamp lifters 122 in a disengaged position permitting the hooks 126 to pass by the corresponding ledges 128. Referring to FIG. 7, the clamp lifters 122 are then moved in the direction of the horizontal arrows to engage the clamps 62, and a suction is provided on suction line 124 in order to provide a vacuum in the billet lifter 120 to engage and lift the billet 60. Referring to FIG. 8, the transport tray loading mechanism 42 is then lifted upward, carrying with it the clamps 62 and billets 60 from the clamp transfer shuttle 24 and billet shuttle 20 for transport to the transport tray on the loading side 14.

Figure 9:
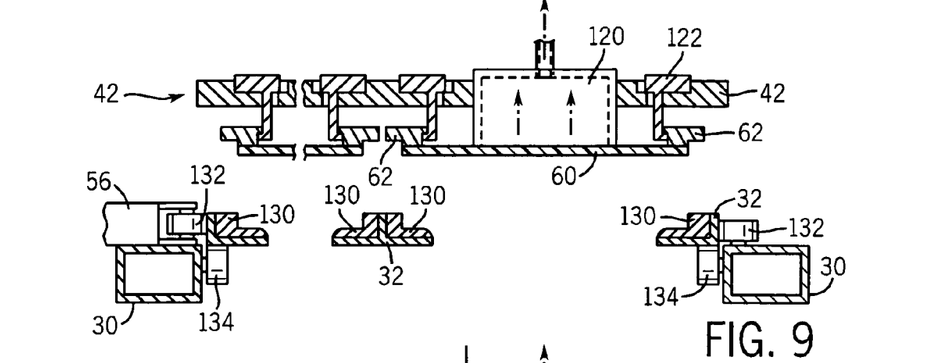
FIG. 9 is a schematic sectional view of the transport tray loading mechanism positioned above a transport tray.

Referring to FIGS. 9-12, the loading sequence for the placement of billets 60 and associated clamps 62 onto a transport tray 32 is shown. FIG. 9 depicts the transport tray loading mechanism 42 after it has been moved over the designated transport tray 32. The billets 60 and clamps 62 are held by the transport tray loading mechanism 42.

The transport tray 32, shown schematically in FIGS. 9-12, is supported and guided by the frame 30 of the scrapless thermoforming machine via horizontal rollers 132 and vertical rollers 134. The use of rollers 132 and 134 that are attached to the frame 30 as opposed to the transport tray 32 permits a mechanically simplified design of the transport trays 32, which do not require rollers. The external frame of the transport tray 32 is guided by many rollers 132 and 134 that are distributed about the track 58.

In an exemplary embodiment, a number of the horizontal rollers 132 are connected to servo motors 56 for providing the motive force necessary to move the transport trays 32 about the track. The use of servo motors 56 is but one way of moving the transport trays 32, and other ways of moving the transport trays 32, such as by chain mechanisms and so forth as are known in the art.

Further referring to FIG. 9, the transport trays 32 have a number of internal frames 130 designed to support each of the billets 60. The frames 130 may be configured as shown in FIGS. 9-12 or may have a different configuration to support the billets, such as the blade approach disclosed in U.S. application Ser. No. 10/234,278.

Figure 10:
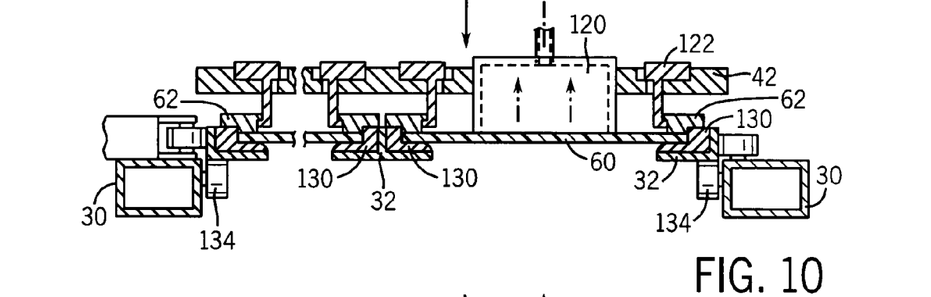
FIG. 10 is a schematic sectional view of the transport tray loading mechanism lowered onto the transport tray.
Figure 11:
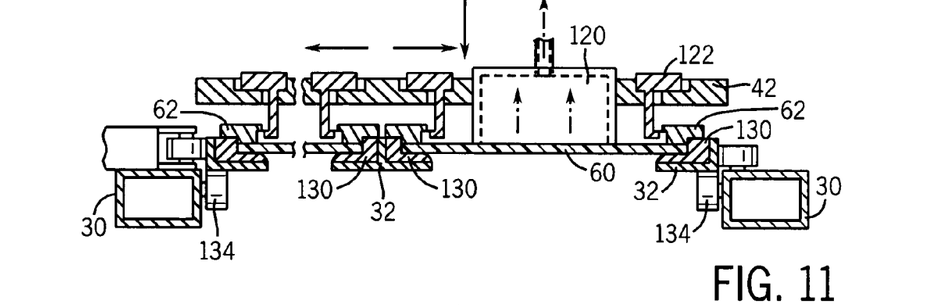
FIG. 11 is a schematic sectional view of the transport tray loading mechanism disengaging the billets and clamps.
Figure 12:
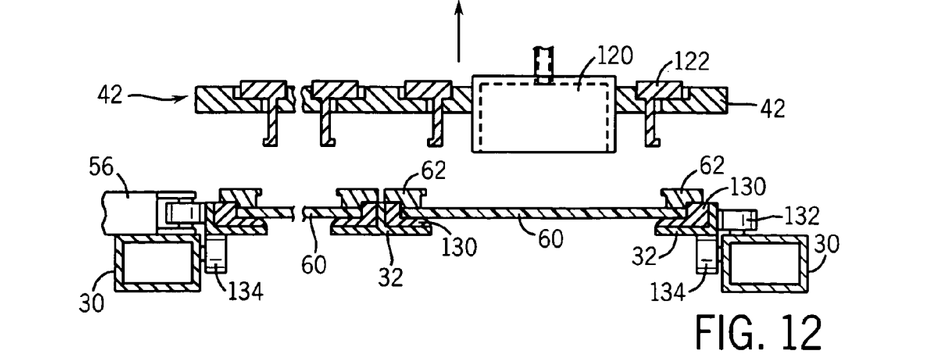
FIG. 12 is a schematic sectional view of the transport tray loading mechanism lifted away from the loaded transport tray.

Referring to FIG. 10, the transport tray loading mechanism 42 moves downward to place the billets 60 and clamps 62 onto the transport tray 32. In an exemplary embodiment, the billets 60 rest upon horizontal portions of the frames 130 and the clamps are supported by the perimeters of the frames 130. Referring to FIG. 11, once the transport tray loading mechanism 42 has been lowered onto the transport tray 32, the suction provided on the billet lifter 120 may be ceased, thus releasing the billets 60 from the various billet lifters 120. Further, the clamp lifters 122 may be disengaged from the clamps 62. Referring to FIG. 12, the transport tray loading mechanism 42 may then be lifted away from transport tray 32, leaving the billets 60 and associated clamps 62 in place for transport about the thermoforming machine.

Figure 13:
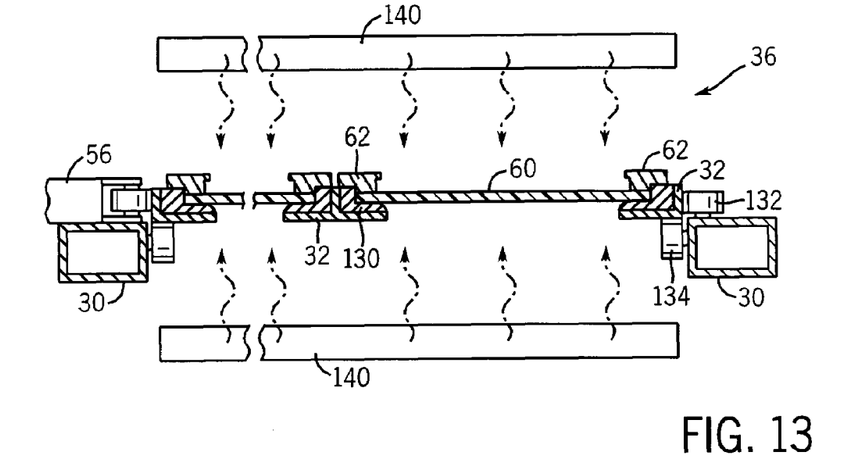
FIG. 13 is a schematic sectional view of the transport tray in a heating station.

Referring to FIG. 13, in an exemplary embodiment, the transport tray 32 first travels to heating station 34 for heating of the billets 60 in preparation for entry into the forming station 36. In an exemplary embodiment, the heating station 34 includes an oven 140 that heats the billets 60 from both the top and bottom of the transport tray 32.

Figure 14:
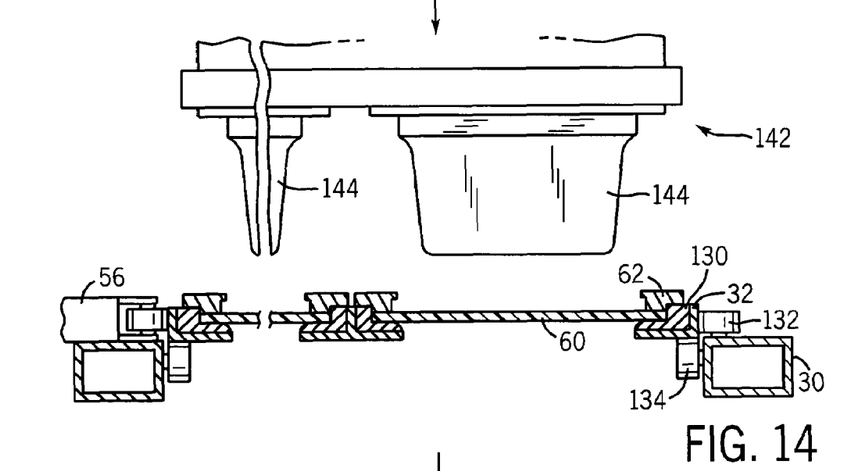
FIG. 14 is a schematic sectional view of the transport tray in a forming station.
Figure 15:
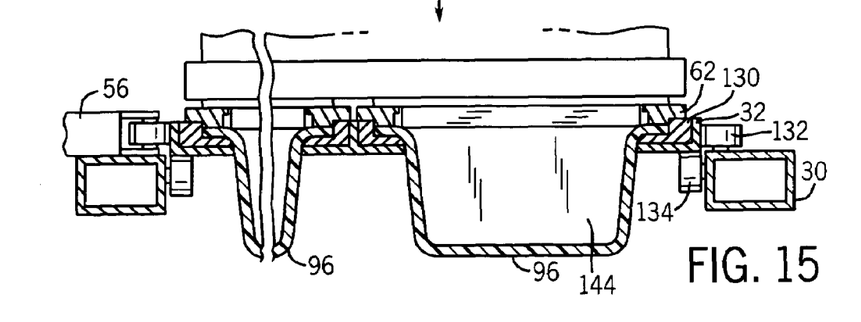
FIG. 15 is a schematic sectional view of the transport tray in the forming station with a forming press engaging a billet to create a formed container.
Figure 16:
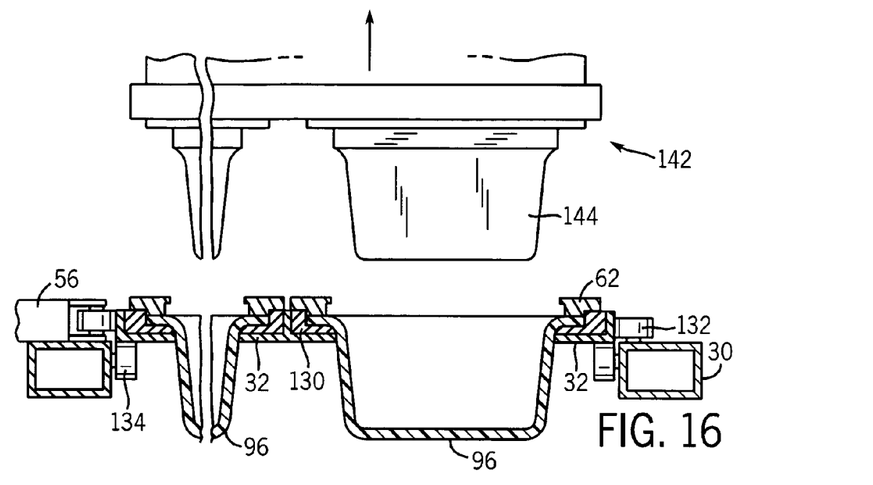
FIG. 16 is a schematic sectional view of the transport tray in the forming station with the forming press lifted out of engagement with the formed container.
Figure 17:
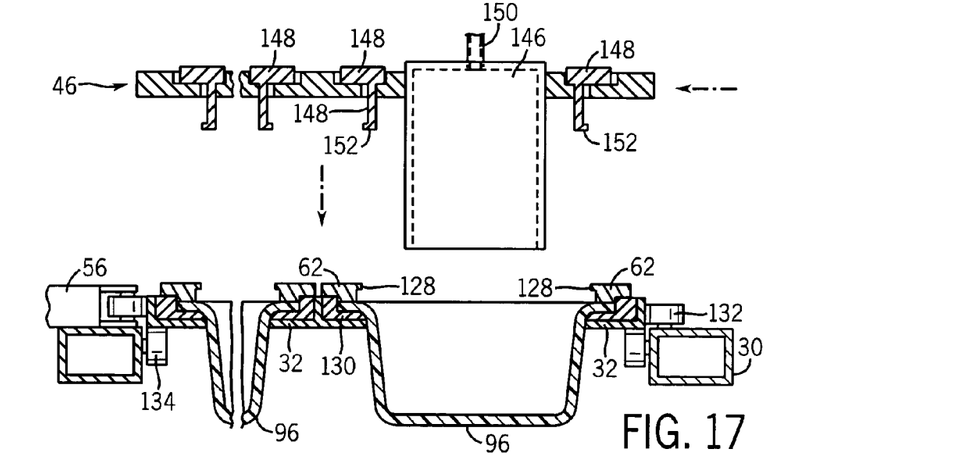
FIG. 17 is a schematic sectional view of a transport tray unloading mechanism positioned above the transport tray.

Referring to FIGS. 14-16, after exiting the heating station, the transport tray 32 enters the forming station 36 (see FIG. 1) where a form press 142 is utilized to convert the billets 60 into formed containers 96. In an exemplary embodiment, the form press 142 utilizes a number of forming plugs 144 to form the billet 60 into the container 96 as is known in the art.

Referring to FIGS. 17-20, after exit from the forming station, the transport tray 32 proceeds to the loading and unloading station for removal of the containers 96 from the transport tray 32 by the transport tray unloading mechanism 46. The transport tray unloading mechanism 46 is first brought into position over the transport tray 32, as is shown in FIG. 2 with respect to transport tray 66. The transport tray unloading mechanism 46 has a similar design to the transport tray loading mechanism 42. A number of container lifters 146 are used to lift the formed containers 96 from the transport tray 32, the container lifters 146 having suction lines 150 to provide a vacuum for engagement of the containers 96 by the container lifter 146. Further, a number of clamp lifters 148 have hooks 152 used to engage with and lift the clamps 62 by the ledges 128 on the clamps 62.

Figure 18:
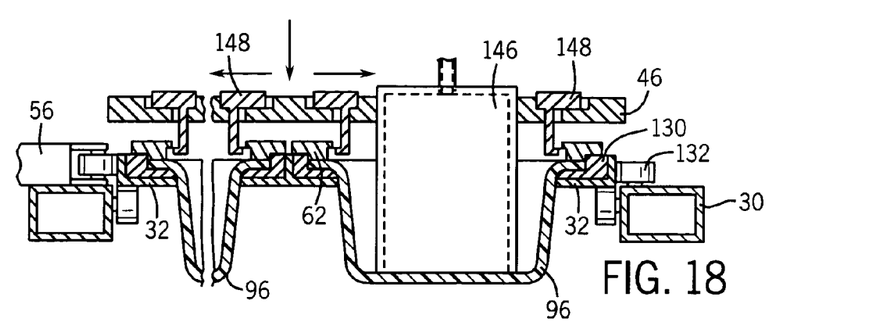
FIG. 18 is a schematic sectional view of the transport tray unloading mechanism positioned for engagement with the clamps and formed containers in the transport tray.
Figure 19:
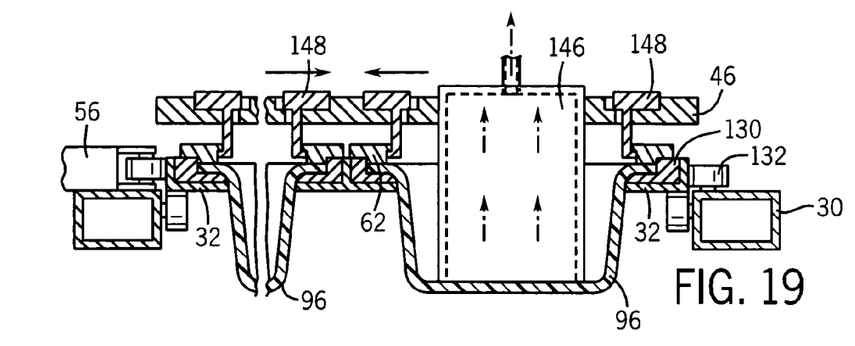
FIG. 19 is a schematic sectional view of the transport tray unloading mechanism engaged with the clamps and formed containers in a transport tray.
Figure 20:
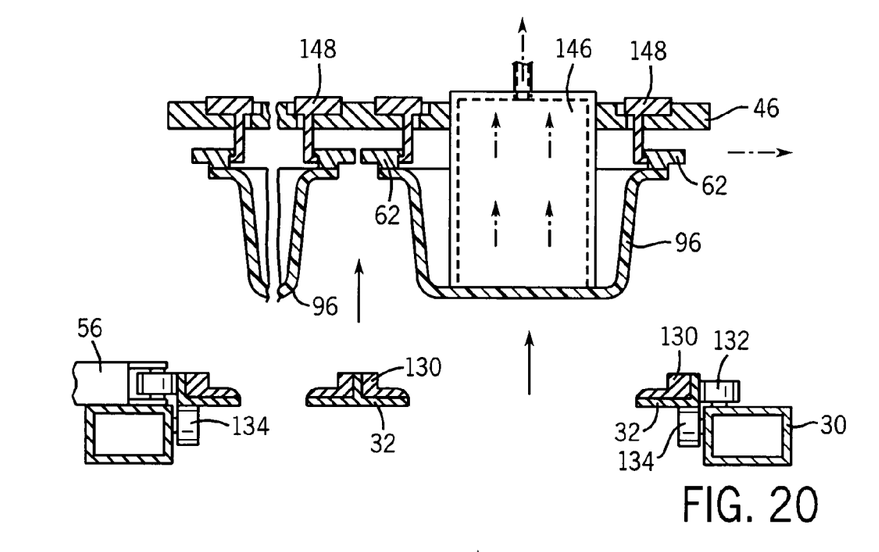
FIG. 20 is a schematic sectional view of the transport tray unloading mechanism having lifted the clamps and formed containers from the transport tray.

Referring specifically to FIGS. 18 and 19, after the transport tray unloading mechanism 46 is lowered onto the transport tray 32, the clamp lifters 148 slide into place to engage the clamps 62 and a suction is applied to the container lifter 146 by the suction line 150 to permit the container lifter 146 to engage containers 96. Referring to FIG. 20, the containers 96 along with the clamps 62 may then be lifted out of the transport tray 32 to be moved to the clamp transfer station for unloading.

Figure 21:
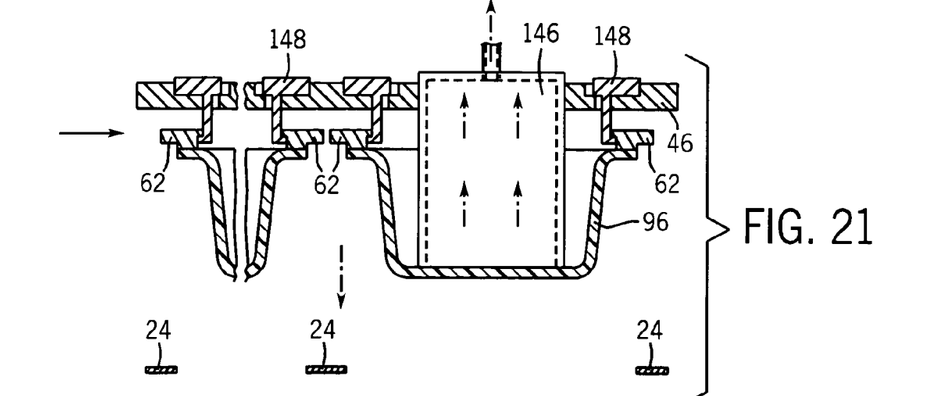
FIG. 21 is a schematic sectional view of the transport tray unloading mechanism positioned above the clamp transfer shuttle.
Figure 22:
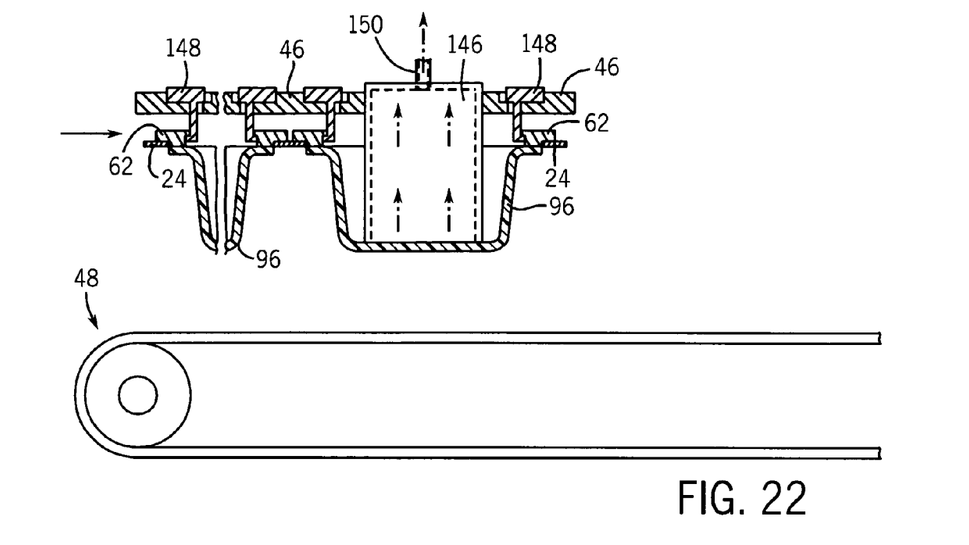
FIG. 22 is a schematic sectional view of the transport tray unloading mechanism positioned over the clamp transfer shuttle and a container transport mechanism.
Figure 23:
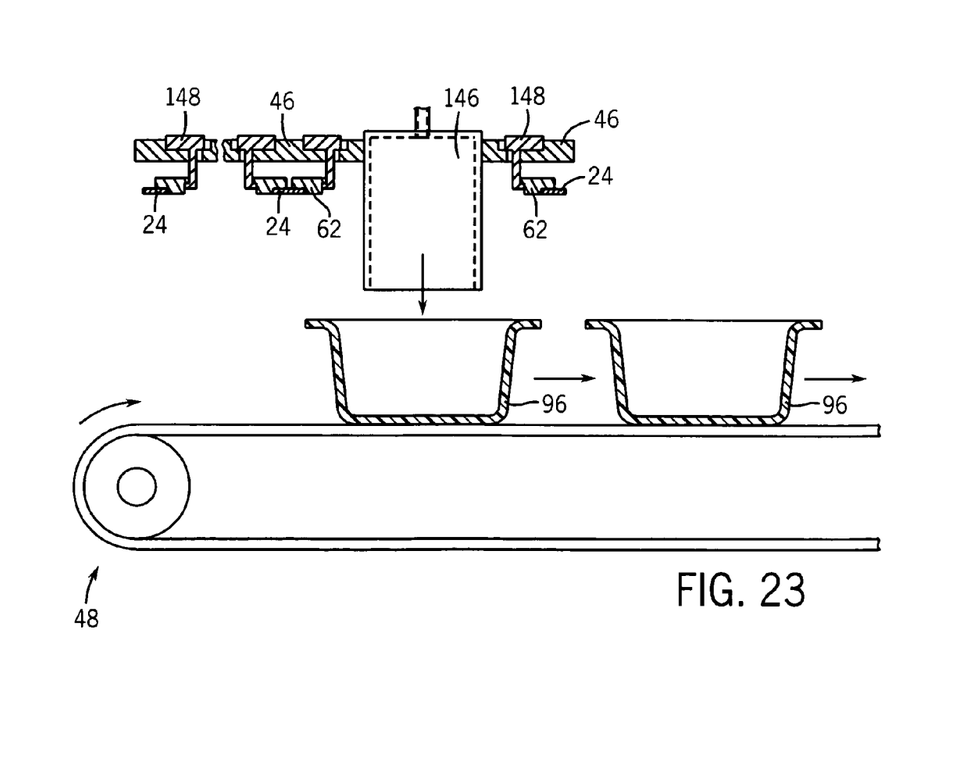
FIG. 23 is a schematic sectional view of the transport tray unloading mechanism having released the formed containers onto the container transport mechanism.
Figure 24:
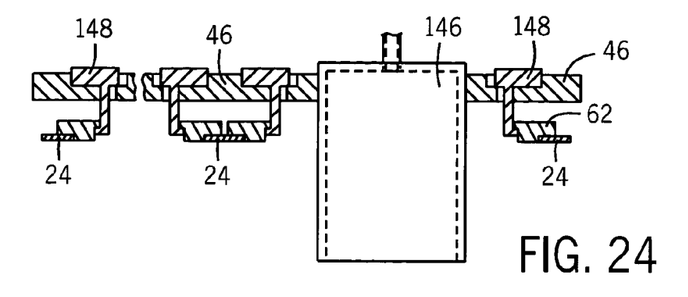
FIG. 24 is a schematic sectional view of the transport tray unloading mechanism positioned above the clamp transfer shuttle.
Figure 25:
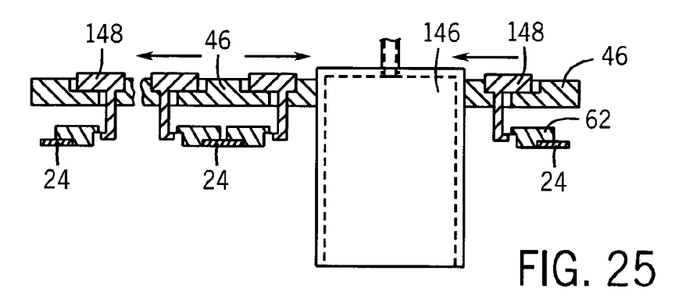
FIG. 25 is a schematic sectional view of the transport tray unloading mechanism releasing the clamps onto the clamp transfer shuttle.
Figure 26:
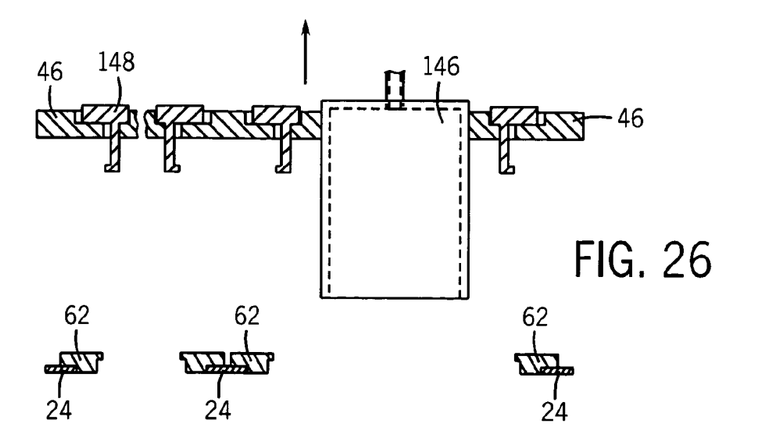
FIG. 26 is a schematic sectional view of the transport tray unloading mechanism lifted away from the loaded clamp transfer shuttle.

Referring to FIGS. 21-23, the transport tray unloading mechanism 46 is brought into place over the clamp transfer shuttle 24, which has been emptied of its clamps and is prepared for receipt of the clamps 62 from the transport tray 32 for delivery to the billet loading side 14 of the loading and unloading station 12 (see FIGS. 1-3). The transport tray unloading mechanism 46 is lowered onto the clamp transfer shuttle 24 as shown in FIG. 22. Note that the apertures in the clamp transfer shuttle 24 are larger than the containers 96 and therefore upon release of the containers 96 by the container lifters 146 (e.g., by reversing the suction on the suction line 150), the containers 96 drop through the apertures in the clamp transfer shuttle 24 and onto the container transport mechanism 48, shown in the embodiment of FIGS. 22 and 23 as a conveyor belt. The clamps 62 are larger than the apertures in the clamp transfer shuttle 24 and therefore are supported by the clamp transfer shuttle 24 upon being released by the clamp lifters 122, as shown in FIGS. 24-26. Once the containers 96 have been released onto the container transport mechanism 48 and the clamps 62 have been placed upon the clamp transfer shuttle 24, the transport tray unloading mechanism 46 may be lifted away from the clamp transfer shuttle 24, which may then be used to transfer the clamps 62 to the billet loading side 14 of the loading and unloading station 12 for use on the next transport tray to be loaded.

Note that the use of the square track 58 as depicted in FIGS. 1-3 is efficient because empty transport trays 32 need not be transported a large distance after unloading of containers 96. Instead, the transport tray is simply moved one space from the container unloading side 16 to the billet loading side 14 of the loading and unloading station 12. Accordingly, the hardware and tooling, such as the transport trays 32 and the clamps 62 are efficiently utilized because they are in productive use on the scrapless thermoforming machine 10 the vast majority of the time.

While the detailed drawings and specific examples given describe various exemplary embodiments, they serve the purpose of illustration only. It is to be understood that the invention is not limited in its application to the details of construction and the arrangements of components set forth in the preceding description or illustrated in the drawings. For example, the frames and billets shown herein are of a substantially rectangular shape, but other billet shapes may be utilized in the scrapless thermoforming process. Further, while the overall process is explained with respect to the utilization of the clamps to secure the billets in place, other processes may not utilize the clamps or may utilize a different type of clamps that are secured to the billets and frames in a different fashion or have a different mechanical configuration. Further still, the billets may be made of many different materials as is known in the art and the transport trays may be configured in different ways to hold fewer or more billets of the same or different shapes and sizes. Furthermore, other substitutions, modifications, changes and omissions may be made in the design, operating conditions, and arrangements of the exemplary embodiments without departing from the scope of the invention as expressed in the appended claims.

What is claimed is:

1. A scrapless thermoforming machine, comprising:
   a plurality of transport trays having frames configured to hold a plurality of thermoplastic billets and billet clamps;
   an oven configured to heat the billets;
   a form press configured to form the billets into containers;
   a loading and unloading station, the loading and unloading station having a billet loading side and a container unloading side, the loading and unloading station comprising:
      a clamp transfer station having a clamp transfer shuttle configured to move the clamps from the container unloading side to the billet loading side;
      a transport tray unloading mechanism on the container unloading side configured to unload the clamps and formed containers from a selected transport tray to the clamp transfer station;
      a billet placement station on the billet loading side configured to place the thermoplastic billets onto a billet shuttle, the billet shuttle configured to move the billets from the billet placement station to the billet loading side of the clamp transfer station; and
      a transport tray loading mechanism configured to transfer the clamps and the billets from the clamp loading station to the selected transport tray on the billet loading side.

2. The scrapless thermoforming machine of claim 1, wherein the billets are substantially rectangular.

3. The scrapless thermoforming machine of claim 2, wherein the frames have a billet support blade defining a perimeter of an opening in the frame.

4. The scrapless thermoforming machine of claim 1, wherein the frames are removably coupled to the transport tray.

5. The scrapless thermoforming machine of claim 1, wherein the billet placement station comprises a billet picker, the billet picker having a suction device configured to engage the billets and transfer the billets from a billet sleeve to the billet shuttle.

6. The scrapless thermoforming machine of claim 1, further comprising a track configured to support the transport trays, and a plurality of servo motors coupled to the track and configured to move the transport trays around the track.

7. The scrapless thermoforming machine of claim 6, wherein the track has a plurality of wheels rotatably coupled thereto, the wheels configured to support the transport trays.

8. The scrapless thermoforming machine of claim 6, wherein the track provides a closed path connecting the loading and unloading station, the oven, and the form press, the closed path forming a polygon.

9. The scrapless thermoforming machine of claim 8, wherein closed path forms a rectangle.

10. The scrapless thermoforming machine of claim 8, wherein the track maintains the transport trays at a constant height along the entire closed path.

11. A scrapless thermoforming machine, comprising:
    a track;
    a loading and unloading station;
    a heating station;
    a forming station;
    a plurality of transport trays configured to transport thermoplastic billets, the transport trays comprising a plurality of frames configured to support the billets;
    a plurality of clamps configured to maintain the billets in the frames;
    a plurality of wheels rotatably coupled to the track, the wheels configured to support the transport trays; and
    a plurality of servo motors coupled to the track and configured to move the transport trays around the track;
    wherein the loading and unloading station has a billet loading side and a container unloading side, the loading and unloading station comprising:
       a clamp transfer station having a clamp transfer shuttle configured to move the clamps from the container unloading side to the billet loading side;
       a transport tray unloading mechanism on the container unloading side configured to unload the clamps from a selected transport tray to the clamp transfer station;
       a billet placement station on the billet loading side configured to place the thermoplastic billets onto a billet shuttle, the billet shuttle configured to move the billets from the billet placement station to the billet loading side of the clamp transfer station; and
       a transport tray loading mechanism configured to transfer the clamps and the billets from the clamp loading station to the selected transport tray on the billet loading side.

12. The scrapless thermoforming machine of claim 11, wherein the billets are substantially rectangular.

13. The scrapless thermoforming machine of claim 11, wherein the frames are removably coupled to the transport tray.

14. The scrapless thermoforming machine of claim 11, wherein the billet placement station comprises a billet picker, the billet picker having a suction device configured to engage the billets and transfer the billets from a billet sleeve to the billet shuttle.

15. The scrapless thermoforming machine of claim 11, wherein the track provides a closed path connecting the loading and unloading station, the heating station, and the forming station, the closed path forming a polygon.

16. The scrapless thermoforming machine of claim 15, wherein the closed path forms a rectangle.

17. The scrapless thermoforming machine of claim 15, wherein the track maintains the transport trays at a constant height along the entire closed path.

18. A scrapless thermoforming machine, comprising:
    a track;
    a loading and unloading station;
    a heating station;
    a forming station;
    a plurality of transport trays configured to transport thermoplastic billets, the transport trays comprising a plurality of frames configured to support the billets;
    a plurality of clamps configured to maintain the billets in the frames; and
    a plurality of wheels rotatably coupled to the track, the wheels configured to support the transport trays;
    wherein the loading and unloading station has a billet loading side and a container unloading side, the loading and unloading station comprising:
       a clamp transfer station having a clamp transfer shuttle configured to move the clamps from the container unloading side to the billet loading side;

a transport tray unloading mechanism on the container unloading side configured to unload the clamps from a selected transport tray to the clamp transfer station;

a billet placement station on the billet loading side configured to place the thermoplastic billets onto a billet shuttle, the billet shuttle configured to move the billets from the billet placement station to the billet loading side of the clamp transfer station; and a transport tray loading mechanism configured to transfer the clamps and the billets from the clamp loading station to the selected transport tray on the billet loading side.

19. The scrapless thermoforming machine of claim 18, further comprising a plurality of servo motors coupled to the track and configured to move the transport trays around the track.

20. The scrapless thermoforming machine of claim 18, wherein the frames are removably coupled to the transport tray.

21. The scrapless thermoforming machine of claim 18, wherein the billet placement station comprises a billet picker, the billet picker having a suction device configured to engage the billets and transfer the billets from a billet sleeve to the billet shuttle.

22. The scrapless thermoforming machine of claim 18, wherein the track provides a closed path connecting the loading and unloading station, the heating station, and the forming station, the closed path forming a polygon.

* * * * *